Sept. 5, 1933.　　　　　A. R. BENNER　　　　　1,925,975
TWO-ROW GRAIN HEADER
Filed June 16, 1932　　　3 Sheets-Sheet 1
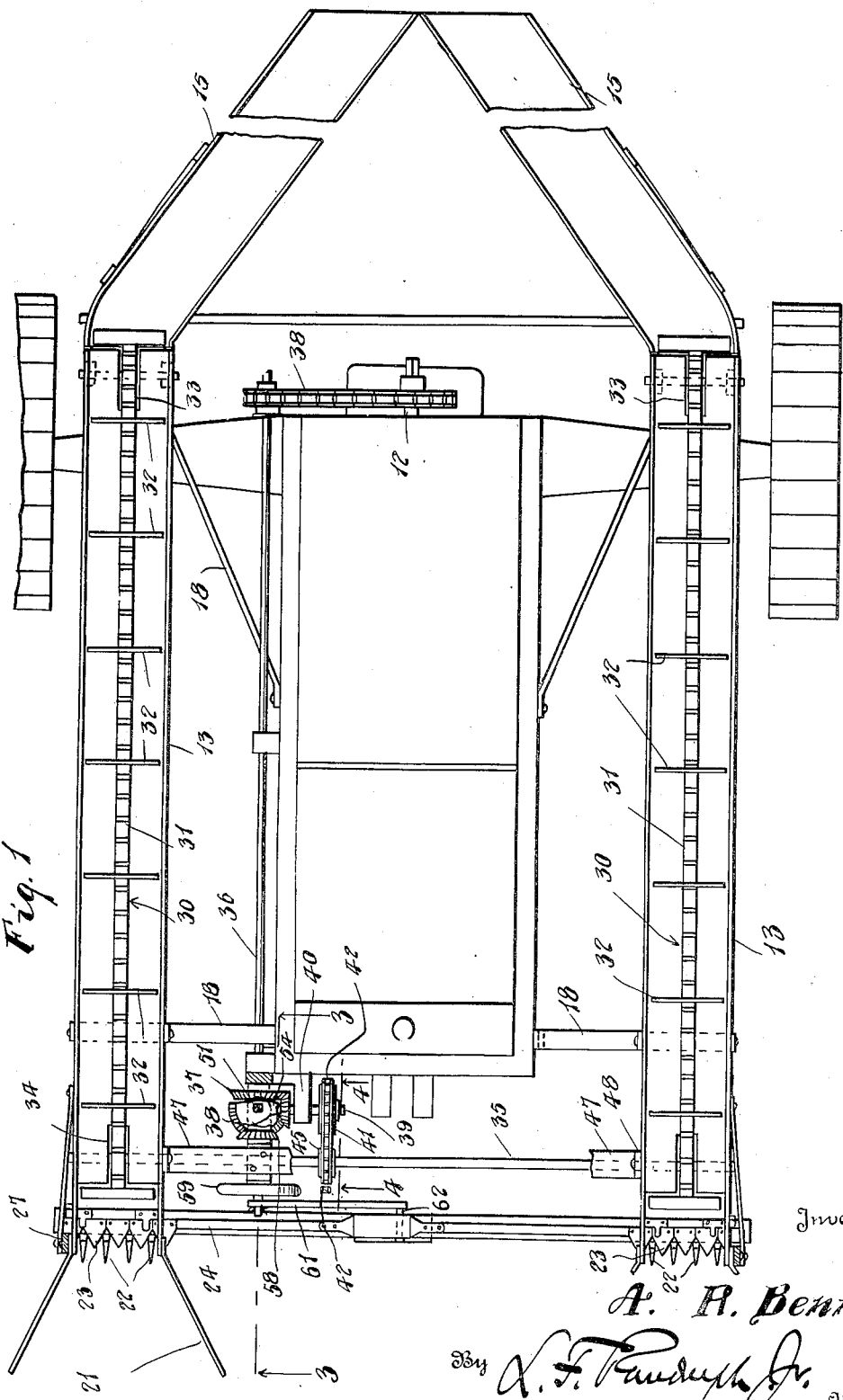

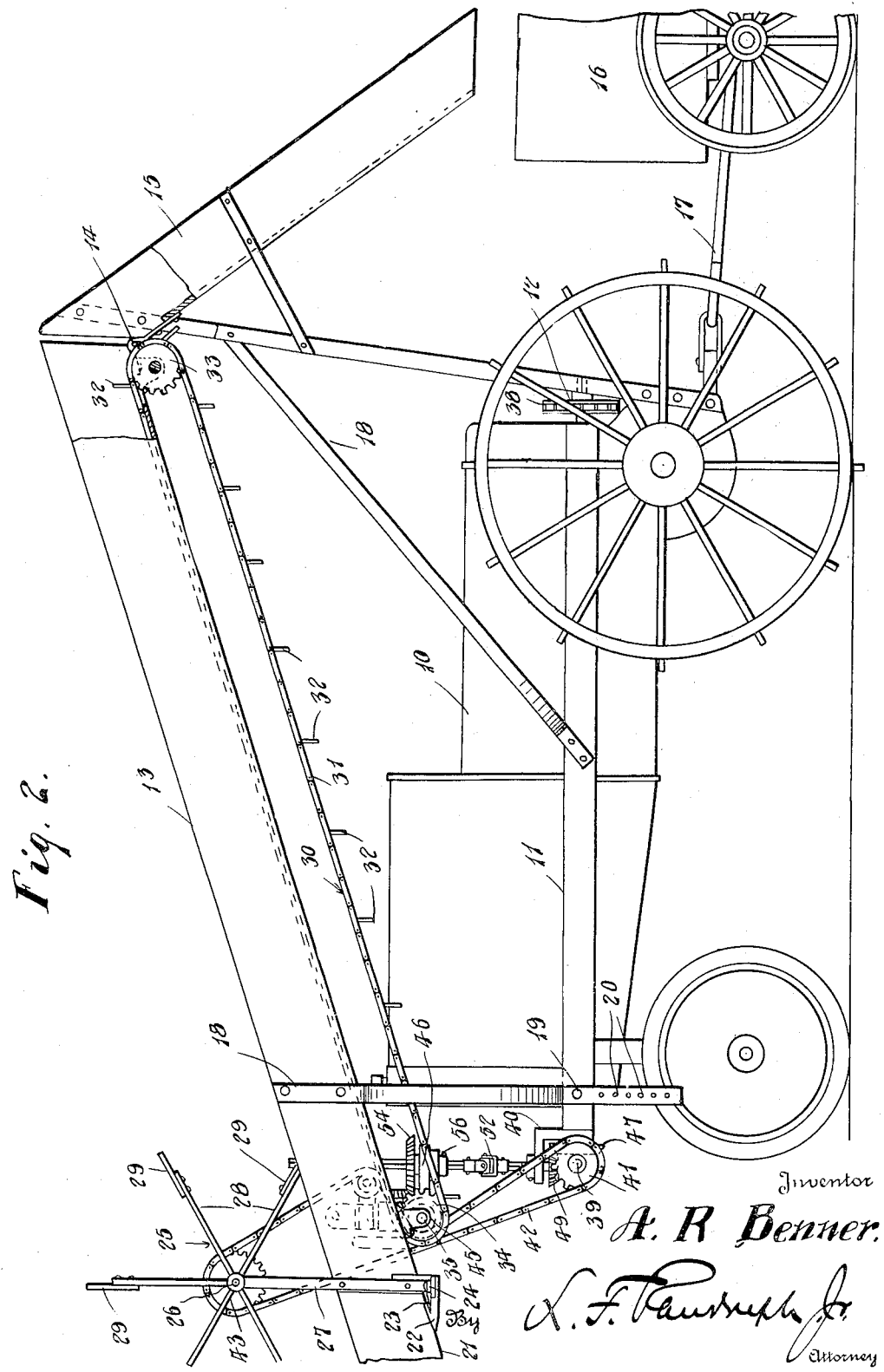

Sept. 5, 1933. A. R. BENNER 1,925,975
TWO-ROW GRAIN HEADER
Filed June 16, 1932 3 Sheets-Sheet 3
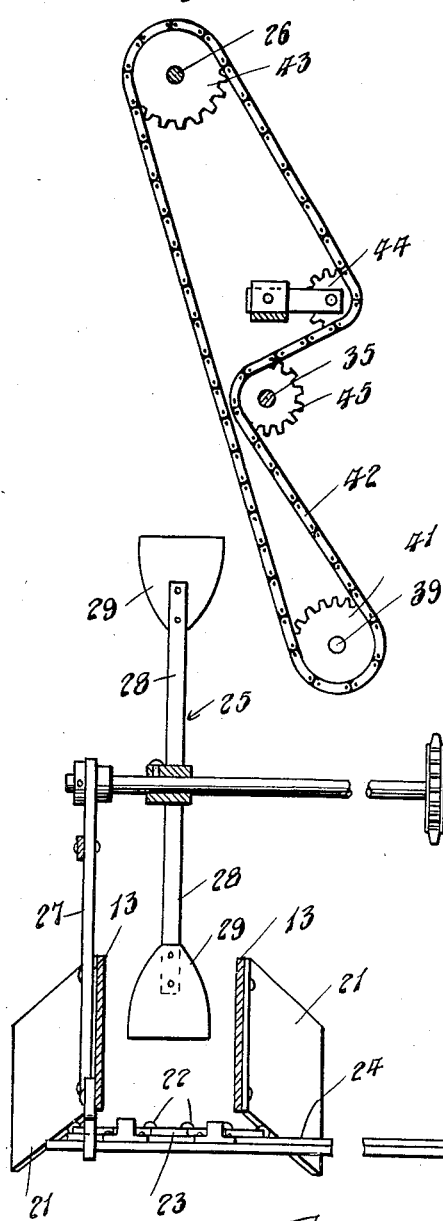
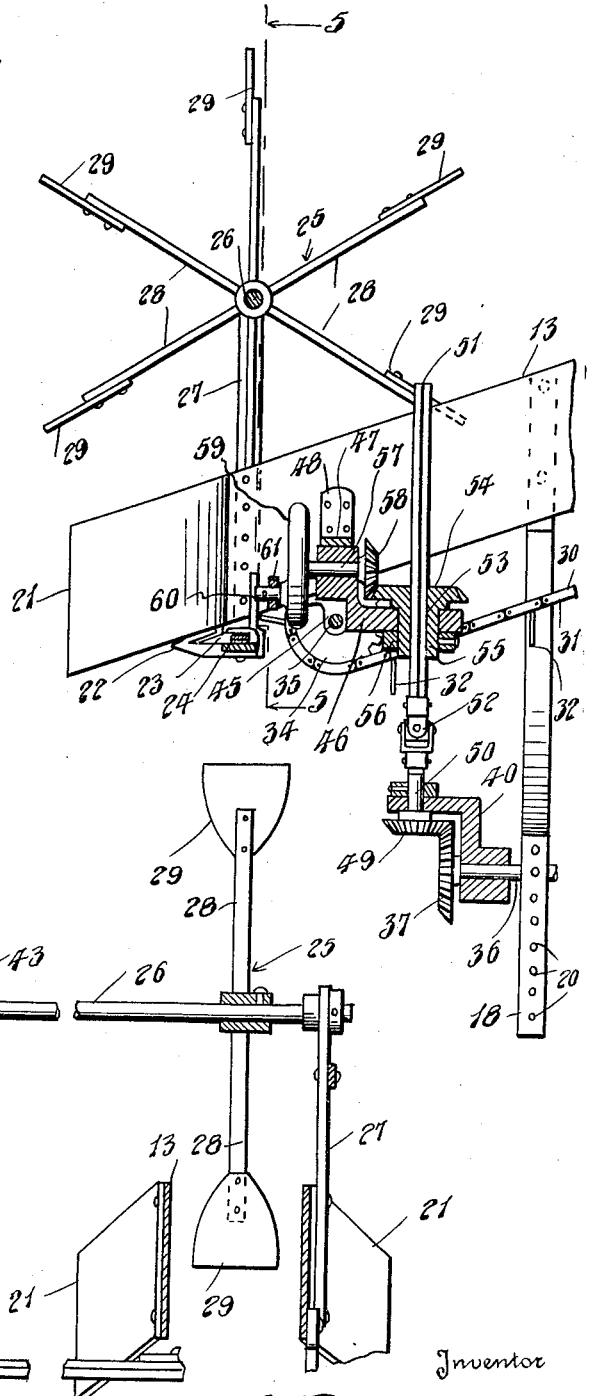
Inventor
A. R. Benner.

Patented Sept. 5, 1933

1,925,975

UNITED STATES PATENT OFFICE 1,925,975

TWO ROW GRAIN HEADER

Arnold R. Benner, Pierce, Tex., assignor of one-third to Selma Benner Nave, El Campo, Tex.

Application June 16, 1932. Serial No. 617,631

6 Claims. (Cl. 56—15)

My invention relates to a two row grain header, particularly adapted for heading maize and the like and it generally aims to provide a novel construction which is simple, strong, durable, relatively cheap to manufacture, and a construction which can be used commercially on row farming tractors.

More specifically it is aimed to provide a novel construction wherein adjustments may be made to head the grain regardless of its height, and a construction whereby the grain will be headed, beaten rearwardly and conveyed to a trailing vehicle or the like.

The more specific objects and advantages will become apparent from a consideration of the description following taken in connection with accompanying drawings illustrating an operative embodiment.

In said drawings:—

Figure 1 is a plan view of the machine,

Figure 2 is a side elevation thereof,

Figure 3 is a sectional view taken on the line 3—3 of Figure 1,

Figure 4 is a sectional view taken on the line 4—4 of Figure 1, and

Figure 5 is a sectional view taken on the plane of line 5—5 of Figure 3.

Referring specifically to the drawings, 10 designates a conventional self-propelled farm tractor having a frame 11. As hereinafter specifically described, the power for operating the improved mechanism constituting my invention, is taken from the power shaft 12 of the propelling motor of the tractor.

A pair of elevating troughs are arranged in parallelism on opposite sides of the tractor as at 13, extending at an upward and rearward inclination and being pivotally connected at their rear ends 14 to discharge chutes 15, which converge and discharge into a trailing vehicle 16 hitched as at 17, so as to be drawn by the tractor. The troughs 15 are rigidly connected to the frame of the tractor in any suitable manner as through the framework 18. Adjacent the forward end, troughs 13 have standards 18 connected thereto, which standards are adjustably connected to the frame 11 through the medium of bolts 19 and a series of openings 20, or by equivalent means, which will enable the forward end of the trough 13 to be raised and lowered, according to the height of the maize or other grain to be headed. The troughs 13 move unitarily since they are connected as will later appear.

The forward ends of the troughs 13 are preferably flared as at 21 and in the throats thereof stationary guard fingers 22 are provided, across which sections 23 of a sickle bar 24 operate in order to sever the grain heads, such bar moving through slots in the side walls of the troughs.

In order that the grain heads will be effectively positioned and moved rearwardly in the troughs adjacent the sections 23, beating reels 25 are provided, one for each trough. Such reels are mounted on a transverse shaft 26 journaled in bearing arms 27 secured to the troughs. The reels consist of radial arms 28 and beater members 29 carried at the outer ends thereof.

The cut or headed grain, passing the sections 23, is dragged upwardly and rearwardly through the troughs 13 by means of conveyors 30 which may consist of sprocket chains 31, having flights 32 thereon. Such sprocket chains are endless and trained over sprocket wheels 33 suitably mounted at the rear ends of the troughs 13 and over sprocket wheels 34 keyed to a transverse shaft 35 at the forward ends of the troughs 13 and suitably journaled in bearings on the troughs. It will be seen that one flight of each conveyor moves on the bottom wall of each trough, the conveyor passing through openings in such bottom wall adjacent the front wheels 33 and 34.

With specific reference to the gearing, a counter shaft 36 is journaled in suitable bearings longitudinally of the frame 11 and is driven by a take off mechanism 38 from the main shaft 12 previously referred to. Such shaft 36 has a bevel gear wheel 37 keyed thereon which is in mesh with a bevel gear 38 carried by a stub shaft 39, journaled in a bearing 40 on the frame 11. On shaft 39, a sprocket wheel 41 is keyed over which a sprocket chain 42 is trained in order to drive the reel-operating shaft 26 through engagement with a sprocket wheel 43 thereon. Said chain 42 passes over a suitably mounted idler 44 and also over a sprocket wheel 45 keyed to a conveyor operating shaft 35.

Said shaft 35 utilizes portion 45 of a bracket 46 as one bearing. Such bracket is rigidly secured to a connecting bar 47, located between the trough 13 and bolted thereto as at 48.

A bevel gear wheel 49 is in mesh with the bevel gear wheel 37, being keyed to a shaft 50 journaled in the bracket 40. A square shaft 51 is connected to the shaft 50 through a universal joint 52. Such square section 51 passes through a square bore 53 of a bevel gear wheel 54, having a sleeve 55, journaled in the bracket 46 and retained by a collar 56. Bracket 46 journals a short shaft 57 at a right angle to square shaft 51 and has a bevel gear 58 thereon in mesh with the bevel gear wheel 54.

Also keyed to shaft 57, is an eccentric disk or wheel 59 having a wrist pin 60 to which a pitman 61 is journaled and which pitman in turn is pivoted on a pin 62 of the sickle bar, whereby the sickle bar will be reciprocated.

The universal joint at 52 in combination with the fact that there is a slidable connection between the square shaft 51 and gear 54, enables the vertical adjustment of the trough 13 on the axis 14.

Various changes may be resorted to provided they fall within the spirit and scope of the invention.

I claim as my invention:—

1. A machine of the class described having a mobile body, a grain discharge trough, a grain receiving trough, means pivoting the latter trough adjacent its rear end to the discharge trough, and means operable to vary the elevation of the second mentioned trough adjacent the forward end thereof, and grain heading means operable adjacent the forward end of the second trough.

2. A machine of the class described having a mobile body, a grain discharge trough, a grain receiving trough, means pivoting the latter trough adjacent its rear end to the discharge trough, means operable to vary the elevation of the second mentioned trough adjacent the forward end thereof, grain heading means operable adjacent the forward end of the second trough, and means to operate said heading means from the mobile body including a yieldable connection to compensate for said adjustment.

3. A machine of the class described having a mobile body, a grain discharge trough, a grain receiving trough, means pivoting the latter trough adjacent its rear end to the discharge trough, means operable to vary the elevation of the second mentioned trough adjacent the forward end thereof, grain heading means operable adjacent the forward end of the second trough, means to operate said heading means from the mobile body including a yieldable connection to compensate for said adjustment, comprising a universal joint, a shaft polygonal in cross section and a gear slidably connected with the shaft.

4. In a grain heading machine, a mobile body, a motor for actuating said body, troughs to receive the grain mounted on opposite sides of said body, conveyors in said troughs, guard fingers in said troughs, a sickle bar reciprocable with respect to the troughs having sections coacting with said guard fingers, grain engaging reels disposed over the sickle, means to operate the reels from the same means which actuate the sickle, and means actuated by said motor to drive said conveyors, sickles and reels.

5. A machine of the class described, comprising a mobile body, a motor for actuating said body, parallel troughs mounted on opposite sides of said body and adapted to receive grain at their forward ends, a shaft between the troughs driven by said motor, guard teeth in the troughs adjacent their forward ends, a sickle bar bridging the troughs having teeth coacting with said guard teeth, a connection to reciprocate said sickle bar from said shaft, beater reels for the grain operable over the said teeth, a connection to actuate said beater reels from said shaft, conveyors operating in said troughs, and a connection to operate said conveyors from said shaft.

6. A machine of the class described having a vertically disposed driven shaft, a universal joint in said shaft, one portion of said shaft being polygonal, a grain receiving trough having a bracket thereon, a gear journaled in the bracket and slidable along said square portion, cutting means operable in the troughs, a stub shaft journaled in the bracket having a gear in mesh with the first mentioned gear, a disk driven by said stub shaft, and a pitman eccentrically connected to said disk and connected to said cutting means.

ARNOLD R. BENNER.